(12) United States Patent
Chen et al.

(10) Patent No.: US 12,542,787 B2
(45) Date of Patent: Feb. 3, 2026

(54) DATA VERIFICATION METHOD AND SYSTEM, AND EDGE-END DEVICE

(71) Applicant: BEIJING JINGDONG QIANSHI TECHNOLOGY CO., LTD., Beijing (CN)

(72) Inventors: Yami Chen, Beijing (CN); Bin Rong, Beijing (CN); Xiaoxia Li, Beijing (CN); Jian Yang, Beijing (CN); Hongwei Wang, Beijing (CN); Wenming Zhe, Beijing (CN); Xiaoqiang Qiao, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 18/566,934

(22) PCT Filed: Apr. 25, 2022

(86) PCT No.: PCT/CN2022/089002
§ 371 (c)(1),
(2) Date: Dec. 4, 2023

(87) PCT Pub. No.: WO2023/273563
PCT Pub. Date: Jan. 5, 2023

(65) Prior Publication Data
US 2024/0275796 A1    Aug. 15, 2024

(30) Foreign Application Priority Data
Jun. 30, 2021  (CN) .......................... 202110737908.0

(51) Int. Cl.
*H04L 9/40*    (2022.01)

(52) U.S. Cl.
CPC ................................. *H04L 63/126* (2013.01)

(58) Field of Classification Search
CPC ..................................................... H04L 63/126
See application file for complete search history.

(56) References Cited

U.S. PATENT DOCUMENTS

| 11,410,480 B2 | 8/2022 | Saito et al. |
| 2003/0006281 A1* | 1/2003 | Thomas ............... G06Q 20/203 |
| | | 705/28 |

(Continued)

FOREIGN PATENT DOCUMENTS

| CN | 102360438 A | 2/2012 |
| CN | 107944509 A | 4/2018 |

(Continued)

OTHER PUBLICATIONS

"International Search Report and English language translation", International Application No. PCT/CN2022/089002, Jul. 8, 2022, 5 pp.

(Continued)

*Primary Examiner* — Vance M Little
(74) *Attorney, Agent, or Firm* — Myers Bigel, P.A.

(57) ABSTRACT

The present disclosure relates to a data verification method, a system, and an edge device, and relates to the field of computer technology. The data verification method includes receiving, by an edge device, cloud data issued by a cloud device and terminal data collected by a terminal device; verifying, by the edge device, the cloud data and the terminal data based on business process logic; and sending, by the edge device, a result of the verifying to at least one of the cloud device or the terminal device.

18 Claims, 13 Drawing Sheets

(56) References Cited

U.S. PATENT DOCUMENTS

| | | | | |
|---|---|---|---|---|
| 2009/0037193 | A1* | 2/2009 | Vempati | G06Q 10/063 |
| | | | | 705/7.15 |
| 2013/0194077 | A1* | 8/2013 | Vargas | G06Q 10/0875 |
| | | | | 340/10.6 |
| 2018/0300671 | A1* | 10/2018 | Richardson | G06Q 10/08 |
| 2020/0214057 | A1* | 7/2020 | Finn | H04W 4/80 |

FOREIGN PATENT DOCUMENTS

| | | | |
|---|---|---|---|
| CN | 208477588 | U | 2/2019 |
| CN | 110414638 | A | 11/2019 |
| CN | 110708370 | A | 1/2020 |
| CN | 112087423 | A | 12/2020 |
| CN | 112269588 | A | 1/2021 |
| CN | 112311525 | A | 2/2021 |
| CN | 112394945 | A | 2/2021 |
| CN | 112394957 | A | 2/2021 |
| CN | 112506659 | A | 3/2021 |
| CN | 112671830 | A | 4/2021 |
| CN | 112712505 | A | 4/2021 |
| CN | 112925652 | A | 6/2021 |
| CN | 112997221 | A | 6/2021 |
| CN | 113342382 | A | 9/2021 |
| GB | 2510874 | B | 9/2020 |

OTHER PUBLICATIONS

Communication with Supplementary European Search Report, EP Application No. 22831392.0, Feb. 27, 2025, 10 pp.

Notice of Grant of Invention Patent Right and English-language translation, CN Application No. 202110737908.0, Jan. 9, 2024, 10 pp.

Hou, Huiling, "Design of bit-paralleled multi-dimension packet classification system based on cloud computing", With English Abstract, Modern Electronics Technique, vol. 43, No. 17, Sep. 1, 2020, 5 pp.

Notice of Reasons for Refusal and English Translation, JP Application No. 2023-579806, Dec. 2, 2025, 8 pp.

\* cited by examiner

DATA VERIFICATION METHOD AND SYSTEM, AND EDGE-END DEVICE

CROSS-REFERENCE TO RELATED APPLICATIONS

The present application is a U.S. National State Application under 35 U.S.C. § 371 of International Patent Application No. PCT/CN2022/089002, filed on Apr. 25, 2022, which itself is based on and claims priority to Chinese application for invention No. 202110737908.0, filed on Jun. 30, 2021, the disclosures of both of which are hereby incorporated into this disclosure herein by reference in their entireties.

TECHNICAL FIELD

This disclosure relates to the field of computer technology, in particular to a data verification method, a data verification system, an edge device, and a nonvolatile computer readable storage medium.

BACKGROUND

In recent years, Radio Frequency Identification (RFID) has been widely adopted by various businesses and warehouses due to its advantages such as contactless, batch reading and easy stocktaking (counting).

In related technologies, verification computation can be performed based on terminals such as RFID readers/writers, or based on cloud devices.

SUMMARY

According to some embodiments of the present disclosure, there is provided a data verification method, comprising: receiving, by an edge device, cloud data issued by a cloud device and terminal data collected by a terminal device; verifying, by the edge device, the cloud data and the terminal data based on business process logic; and sending, by the edge device, a result of the verifying to at least one of the cloud device or the terminal device.

In some embodiments, the data verification method further comprises, before receiving the cloud data and the terminal data: sending, by the edge device, a verification activation request to the cloud device; and receiving, by the edge device, an activation response returned from the cloud device, the activation response comprising relevant information about the business process logic.

In some embodiments, the verification activation request comprises version information of edge software currently deployed on the edge device, and the activation response comprises update information of the edge software.

In some embodiments, the verifying the cloud data and the terminal data based on business process logic comprises: matching, by the edge device, the terminal data with the cloud data, and determining whether the verifying is passed based on a result of the matching; or verifying, by the edge device, the terminal data based on the cloud data.

In some embodiments, the verifying the cloud data and the terminal data based on business process logic comprises: determining, by the edge device, whether the terminal data comprises abnormal data; and determining, by the edge device, whether the verifying is passed based on a result of the determining and a result of the matching.

In some embodiments, the cloud data are checklist data comprising item tag data; and the determining whether the terminal data comprise abnormal data comprises: determining, by the edge device, whether the terminal data comprise abnormal data based on at least one of item location information or tag data status information.

In some embodiments, the cloud data comprise item tag data; and the verifying the cloud data and the terminal data based on business process logic comprises: determining, by the edge device, whether the terminal data match a location where the terminal device is located; and in case of the terminal data not matching the location, reporting, by the edge device, the terminal data to the cloud device, for the cloud device to determine whether the terminal data are abnormal data.

In some embodiments, the receiving, by an edge device, cloud data issued by a cloud device and terminal data collected by a terminal device comprises: receiving, by the edge device, a check request issued by the cloud device, the check request comprising a list of Radio Frequency Identification (RFID) data to be checked as the cloud data; and receiving, by the edge device, RFID data collected by the terminal device as the terminal data.

In some embodiments, the sending a result of the verifying to at least one of the cloud device or the terminal device comprises: sending, by the edge device, the terminal data that do not match the cloud data to the cloud device; sending, by the edge device, a result of filtering of abnormal data and verification performed by the cloud device on mismatched terminal data to the terminal device; receiving, by the edge device, check completion information returned from the terminal device, the check completion information comprising a checklist number; and sending, by the edge device, check completion information to the cloud device, the check completion information comprising the checklist number, the list of RFID data that has been checked, and registration information about abnormal situation.

In some embodiments, the receiving, by the edge device, RFID data collected by the terminal device as the terminal data comprises: receiving, by the edge device, a verification request sent from the terminal device based on an edge location address issued by the cloud device and comprising a verification sheet number; sending, by the edge device, verification confirmation information to the terminal device, the verification confirmation information comprising a verification sheet number; and receiving, by the edge device, RFID data collected by the terminal device as the terminal data.

In some embodiments, the receiving, by an edge device, cloud data issued by a cloud device and terminal data collected by a terminal device comprises: sending, by the edge device, a check request sent from the terminal device to the cloud device, the check request comprising information on the location of item data to be checked; sending, by the edge device, a check response returned from the cloud device to the terminal device, the check response comprising a list of RFID data to be checked as cloud data; and receiving, by the edge device, RFID data collected by the terminal device as the terminal data.

In some embodiments, the receiving, by an edge device, cloud data issued by a cloud device and terminal data collected by a terminal device comprises: receiving, by the edge device, a counting request issued by the cloud device, the counting request comprising a list of data to be checked as the cloud data; and receiving, by the edge device, counting data collected by the terminal device as the terminal data.

In some embodiments, the sending a result of the verifying to at least one of the cloud device or the terminal device comprises: sending, by the edge device, the result of the verifying to the terminal device; and after receiving counting completion information returned from the terminal device, sending, by the edge device, counting result data to the cloud device.

In some embodiments, the receiving, by an edge device, cloud data issued by a cloud device and terminal data collected by a terminal device comprises: sending, by the edge device, a check request sent from the terminal device to the cloud device, the check request comprising information on a warehouse area where item data to be checked is located; sending, by the edge device, a check response returned from the cloud device to the terminal device, the check response comprising a list of RFID data to be checked as cloud data; and receiving, by the edge device, collected RFID data returned from the terminal device as the terminal data.

In some embodiments, the receiving, by an edge device, cloud data issued by a cloud device and terminal data collected by a terminal device comprises: receiving, by the edge device, a check request issued by the cloud device, the check request issued by the cloud device comprising a list of RFID data to be checked as the cloud data; receiving, by the edge device, a check request sent from the terminal device, the check request sent from the terminal device comprising information on a warehouse area where item data to be checked is located; sending, by the edge device, a check response to the terminal device; and receiving, by the edge device, collected RFID data returned from the terminal device as the terminal data.

In some embodiments, the receiving, by an edge device, cloud data issued by a cloud device and terminal data collected by a terminal device comprises: receiving, by the edge device, a list of RFID data to be checked issued by the cloud device and forwarded by the terminal device as the cloud data, the cloud data being issued from the cloud device to the terminal device in response to the check request sent from the terminal device; and receiving, by the edge device, collected RFID data sent from the terminal device as the terminal data.

In some embodiments, the receiving, by an edge device, cloud data issued by a cloud device and terminal data collected by a terminal device comprises: receiving, by the edge device, a list of RFID data of items to be shelved that is issued by the cloud device and forwarded by the terminal device as the cloud data, the cloud data being issued from the cloud device to the terminal device in response to a shelving request sent from the terminal device; and receiving, by the edge device, collected RFID data sent from the terminal device as the terminal data.

In some embodiments, the terminal device is a portal frame hardware device, the cloud device is an item management system, the cloud data are checklist data, and the terminal data are RFID data; the verifying the cloud data and the terminal data based on business process logic comprises verifying checking data by the edge device; and the sending a result of the verifying to at least one of the cloud device or the terminal device comprises: sending a result of the verifying of the checking data to an application on the item management system and sending checking status to a display device.

According to further embodiments of the present disclosure, there is provided an edge device, comprising: a receiver for receiving cloud data issued by a cloud device and terminal data collected by a terminal device; a processor for verifying the cloud data and the terminal data based on business process logic; and a transmitter for transmitting a result of the verifying to at least one of the cloud device or the terminal device.

According to some other embodiments of the present disclosure, there is provided a data verification system, comprising: an edge device for implementing the data verification method according to any one of the above embodiments; a cloud device for issuing cloud data; and a terminal device for collecting terminal data.

According to further embodiments of the present disclosure, there is provided an edge device, comprising: a memory; and a processor coupled to the memory, the processor configured to, based on instructions stored in the memory, carry out the data verification method according to any one of the above embodiments.

According to still other embodiments of the present disclosure, there is provided a nonvolatile computer readable storage medium having stored thereon a computer program that, when executed by a processor, implements the data verification method according to any one of the above embodiments.

In the above embodiments, a verification calculation task is distributed to an edge device, so that terminal costs and power consumption can be reduced; in addition, verification can be performed on the edge device instead of the cloud device, which can improve processing efficiency, reduce network load, and thus improve verification efficiency.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Figure 1:
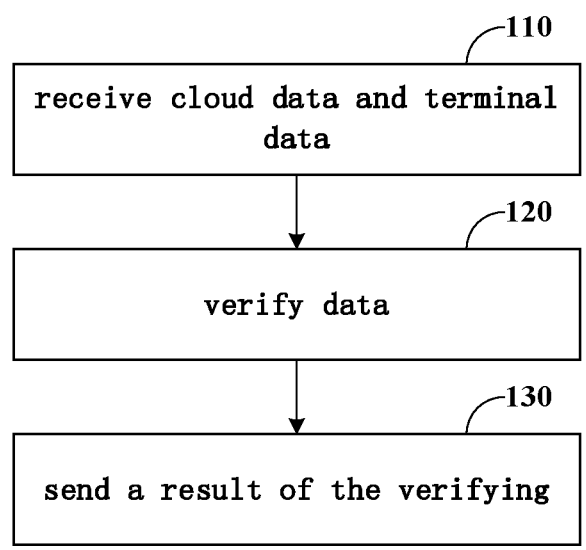
FIG. 1 shows a flowchart of some embodiments of a data verification method according to the present disclosure.

Various exemplary embodiments of the present disclosure will now be described in detail with reference to the accompanying drawings. Notice that, unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

As mentioned above, RFID-based warehousing operations face some new challenges: warehousing operations often involve the verification of tags or barcodes, comprising inbound, inventory counting, outbound checking, etc., to ensure the consistency of items; Warehousing operations based on RFID batch recognition requires massive concurrent processes for verification, creating challenges for both terminal-based verification and cloud-based verification.

For example, for an RFID warehouse management system based on RFID reader/writer terminal verification computation, considering the uncontrollable factors of the on-site network, many verification calculations will be distributed to terminals, comprising some sites in the form of RFID fixed readers/writers, etc.

This verification method has the following problems: it requires terminals with strong storage and computing capabilities, which increases the power consumption and cost of the terminals and individual nodes. Terminals or nodes with insufficient capabilities may cause system lag, slow response, and other phenomena that may affect user experience and production efficiency; the transmission of a large amount of verification data to fully distributed terminals may pose potential data security risks.

For example, for a RFID warehouse management system based on cloud verification computation, the cloud has massive storage and computing power, which can reduce the computational and storage burden on the terminals. However, the long cloud chain can cause a large delay in system response, and if the network is unstable, response failures may occur. The real-time upload of large amounts of data also presents a greater challenge to the network.

That is, for warehouse management, batch RFID data collection and verification based on terminals or the cloud cannot achieve an effective balance between terminal costs, data security and rapid task response.

All of the inbound, inventory counting and outbound stages of warehouse management involve batch RFID data collection and verification. The experience and cost reduction gained from the use of RFID in these stages will directly improve the ROI (Return On Investment) of the application of RFID, comprising reducing terminal costs, improving work experience and efficiency.

The inventors of the present disclosure have found the following problems existed in the related art: Inability to achieve a balance between equipment costs, verification efficiency and other matters, resulting in a reduction in verification effectiveness.

In view of this, the present disclosure proposes a technical solution for data verification that can reduce equipment costs, improve verification efficiency, and thereby improve verification effectiveness. For the above technical problem, the technical solution of the present disclosure can be realized by the following embodiments.

FIG. 1 shows a flowchart of some embodiments of a data verification method according to the present disclosure.

As shown in FIG. 1, in step 110, an edge device receives cloud data issued by a cloud device and terminal data collected by a terminal device.

For example, the terminal device may be a RFID reader/writer, comprising a handheld reader/writer, a PDA (Personal Digital Assistant) that support RFID collection, a fixed installed RFID reader/writer (comprising a access door, etc.), a read-only RFID collection device, a RFID collection device with separate RFID excitation and collection data reception, etc.

For example, a RFID reader/writer can be connected to an edge device through a local area connection such as WiFi (Wireless Fidelity), wired, USB (Universal Serial Bus) connection, or via a cellular network.

For example, edge devices and RFID readers/writers can have a one-to-one relationship or a one-to-many relationship. In terms of job scheduling, edge devices and RFID readers/writers can also have a many-to-many relationship, and load balancing scheduling can be achieved across multiple edge devices.

In some embodiments, a cloud device may actively push data to be verified (cloud data) to an edge device in response to the triggering of an appropriate event. For example, after a picking task or a converging (combination) process is completed, a WMS (Warehouse Management System), as a cloud device, may send a checklist containing an RFID list to an edge device of a warehouse corresponding to the picking task.

For example, the cloud device may be an item management system. The item management system may be a WMS, a store system, an asset management system, etc., and the items may comprise pallets, bins, warehoused goods, etc.

In some embodiments, when a task terminal device initiates a check request, the cloud device pushes the data to be verified to the edge device; or the data to be verified can be forwarded to the edge device via the terminal device.

In some embodiments, before step 110, the verification method further comprises: sending, by the edge device, a verification activation request to the cloud device; and receiving, by the edge device, an activation response returned from the cloud device, the activation response comprising relevant information about business process logic.

For example, the verification activation request comprises version information of edge software currently deployed on the edge device, and the activation response comprises update information of the edge software. The edge software may be associated with business process logic.

For example, the verification activation request may comprise a verification activation update request.

In some embodiments, the cloud device sends a verification activation request or a verification activation update to the edge device; the cloud device receives an activation response returned from the edge device, the activation response comprising a verification activation or verification activation update confirmation.

For example, the verification activation update comprises version information of edge software related to the business process logic currently supported by the cloud device. The activation response may comprise a download confirmation and a link request for the edge software.

In some embodiments, software for verification can be deployed in advance on the edge device, the software comprising business process logic. For example, the business process logic comprises a verification sheet number parsing method, verification rules and algorithms, as well as a verification input data format, a verification output data format, an event-driven interaction method, etc.

For example, the business process logic can be shown in the following table:

| Sequence number | verification rule and algorithm | verification input data format | verification output data format | event-driven interaction method |
|---|---|---|---|---|
| 1 | match the collected tag data with all cloud input tag data; | collected tag value; a list of tag values to be verified | Match, tag value; not match, tag value; | if match, feedback to the terminal: MATCH, tag value; if not match, not feedback |
| 2 | match the collected tag data with all cloud input tag data; confirm the status of the collected tag | collected tag value; a list of tag values to be verified, each tag value having tag status data | the tag matches the status, tag value; the tag does not match the status, tag value; | if match, feedback to the terminal: MATCH, tag value; if not match, feedback NOT MATCH, tag value |
| 3 | match the collected tag data with all cloud input tag data; confirm the status of the collected tag; filter abnormal data; abnormal data filtering method (bulk warehoused goods at the same storage location) | collected tag value; a list of tag values to be verified, each tag value having tag status data | the tag matches the status, tag value; the tag does not match the status, tag value; | if match, feedback to the terminal: MATCH, tag value; if no abnormal data, and not match, feedback NOT MATCH, tag value if there is abnormal data, not feedback |
| 4 | match the collected tag data with all cloud input tag data; confirm the status of the collected tag; filter abnormal data; abnormal data filtering method (bulk warehoused goods at the same storage location) | collected tag value; a list of tag values to be verified, each tag value having tag status data | the tag matches the status, tag value; the tag does not match the status, tag value; | if match, feedback to the terminal: MATCH, tag value; if no abnormal data, and not match, feedback NOT MATCH, tag value; if there is abnormal data, report to the cloud device for analysis |

For example, status information of tag data comprises the status of goods in a tied warehouse, which can be Initialization (printed, not shelved), Inbound (successfully shelved), Outbound (checked out for delivery), Picked (to be checked), etc.

For example, the abnormal data detection may comprise: during the check process, identifying a large number of tags of a certain storage location in the checklist; base on auxiliary information (such as a map of storage locations), recognizing that some of these tags were for goods stored near the check area, and were not pulled to a check platform of a warehouse; determining that this part of tag data are abnormal data, which are tag data caused by storage drifting (misidentification) near the check area.

Figure 2:
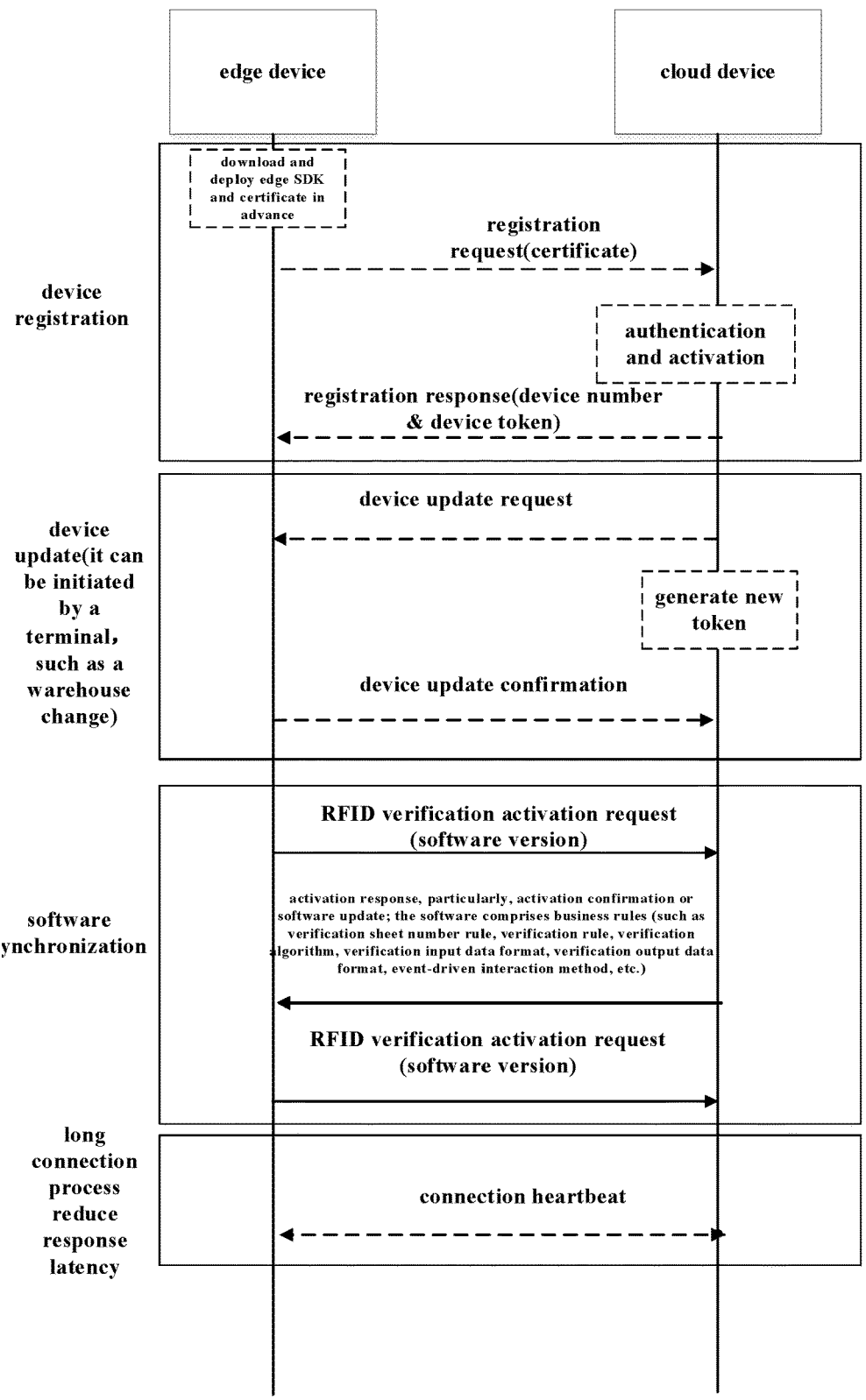
FIG. 2 is a schematic diagram showing some embodiments of the initialization configuration of an edge device according to the present disclosure.

In some embodiments, initialization configuration can be performed for the edge device according to the embodiment shown in FIG. 2.

FIG. 2 is a schematic diagram showing some embodiments of the initialization configuration of an edge device according to the present disclosure.

As shown in FIG. 2, in the process of edge device registration, the edge device downloads an edge SDK (Software development kit) and a certificate to be deployed in advance; the edge device sends a registration request to the cloud device, the registration request comprising the certificate; the cloud device performs authentication and activation processing; the cloud device returns a registration response to the edge device, the registration response comprising a serial number of the edge device and a token.

During the edge device updating process, the cloud device sends a device update request to the edge device; the cloud device generates a new token for the edge device; the edge device returns device update confirmation information.

During the software synchronization process, the edge device sends a RFID verification activation request to the cloud device, comprising version information of the currently deployed software; the cloud device returns an activation response.

For example, the activation response comprises activation confirmation information or software update information, comprising business process logic (such as verification sheet number rules, verification rules, verification algorithms, verification input data formats, verification output data formats, event-driven interaction methods, etc.).

During the long connection process, the edge device and the cloud device can reduce response latency by sending continuous heartbeat signals.

After receiving data from the cloud device and the terminal device, processing can be continued with the remaining steps in FIG. 1.

In step 120, the edge device verifies the cloud data and the terminal data based on the business process logic.

In some embodiments, in a warehousing environment, verification may comprise RFID legality verification for batch warehousing of warehouse goods, RFID inventory counting verification for warehoused goods, RFID verification for batch delivery of goods, RFID check verification, etc.

For example, in the scenario of warehouse assets, the above verification process may be used for counting RFID assets such as pallets. It can also be used in scenarios such as batch receipt at stores and batch settlement verification.

In some embodiments, the edge device matches the terminal data to the cloud data; the edge device determines whether the verification is passed based on a result of the match. For example, the edge device determines whether the terminal data comprise abnormal data; the edge device determines whether the verification is passed based on a result of the determination and a result of the match.

For example, after determining whether the terminal data are abnormal, whether the item position is abnormal can be further determined.

In some embodiments, the cloud data are a checklist data that comprises item tag data. The edge device determines whether the terminal data comprise abnormal data based on at least one of item location information or tag data status information. For example, the item may be warehoused goods. For example, the item location information may be the item storage location information in a warehouse.

In some embodiments, the cloud data comprise item tag data. The edge device determines whether the terminal data match a warehouse area where the terminal device is located; in case of the terminal data not matching the warehouse area, the edge device reports the terminal data to the cloud device, so that the cloud device can determine whether the terminal data are abnormal data.

For example, in addition to matching warehouse area information, location information of items can also be matched for the store scenario.

In some embodiments, the edge device receives a check request issued by the cloud device, the check request comprising a list of RFID data to be checked as the cloud data; the edge device receives RFID data collected by the terminal device as the terminal data.

In step 130, the edge device sends a result of the verifying to at least one of the cloud device or the terminal device.

In some embodiments, the edge device directly or indirectly synchronizes the result of the verifying to a task terminal (which can be integrated with a RFID reader/writer), the cloud, or an available display, thereby achieving synchronization of business status.

For example, after the verifying is completed at the edge device, the task terminal can be notified to complete an interaction between the task terminal and the cloud device; or after the verifying is completed at the edge device, the cloud device can be informed to be responsible for synchronizing with the task terminal or a related display; or the edge device can directly synchronize the result of the verifying to the task terminal, the cloud device, and other display.

In the above embodiment, the cloud device sends business data that need to be verified by the RFID reader/writer (terminal device) to the edge device; after the RFID reader/writer collects RFID data, it is verified by the edge device; the edge device directly or indirectly synchronizes the result of the verifying to the task terminal (which can be integrated with a RFID reader/writer), the cloud device, or an available display, thereby achieving synchronization of business status.

In this way, verification computation is introduced on the RFID edge side, and a common storage and computing device is provided for RFID readers/writers (terminal devices) at a nearby location. As a result, the power consumption and cost of the reader/writer are reduced, and real-time computing response is provided.

In some embodiments, collaborative verification can be performed by the edge device and the cloud device. This can avoid the need to send large amounts of data to the edge device, which would otherwise place a high load on the edge device, and can also improve data security.

For example, during the inventory counting process, the edge device can receive data to be verified from adjacent two tunnels; if there are RFID data collected by terminals of more than two tunnels, this situation is reported to the cloud device. The cloud device determines whether operation data are abnormal. Abnormal data can be caused by tags drifting over long distances or by tags that are not in stock. In this way, the edge device does not need to consider the status of the abnormal tags, so that its processing load can be reduced.

For example, during the checking process, the edge device verify based on the list of data to be checked; a batch of abnormal inventory data from the same storage location is filtered, and the abnormal RFID tag data are reported to the cloud device; data filtering is confirmed by the cloud device based on a larger amount of data.

This collaborative verification between the edge device and the cloud device is suitable for an inventory counting scenario where a very large amount of data are verified locally, as well as for a checking scenario where cloud-assisted abnormal data filtering is required if the surrounding environment is not clean.

In this way, the cloud device can assist the edge device in anomaly detection based on a larger amount of data.

Figure 3A:
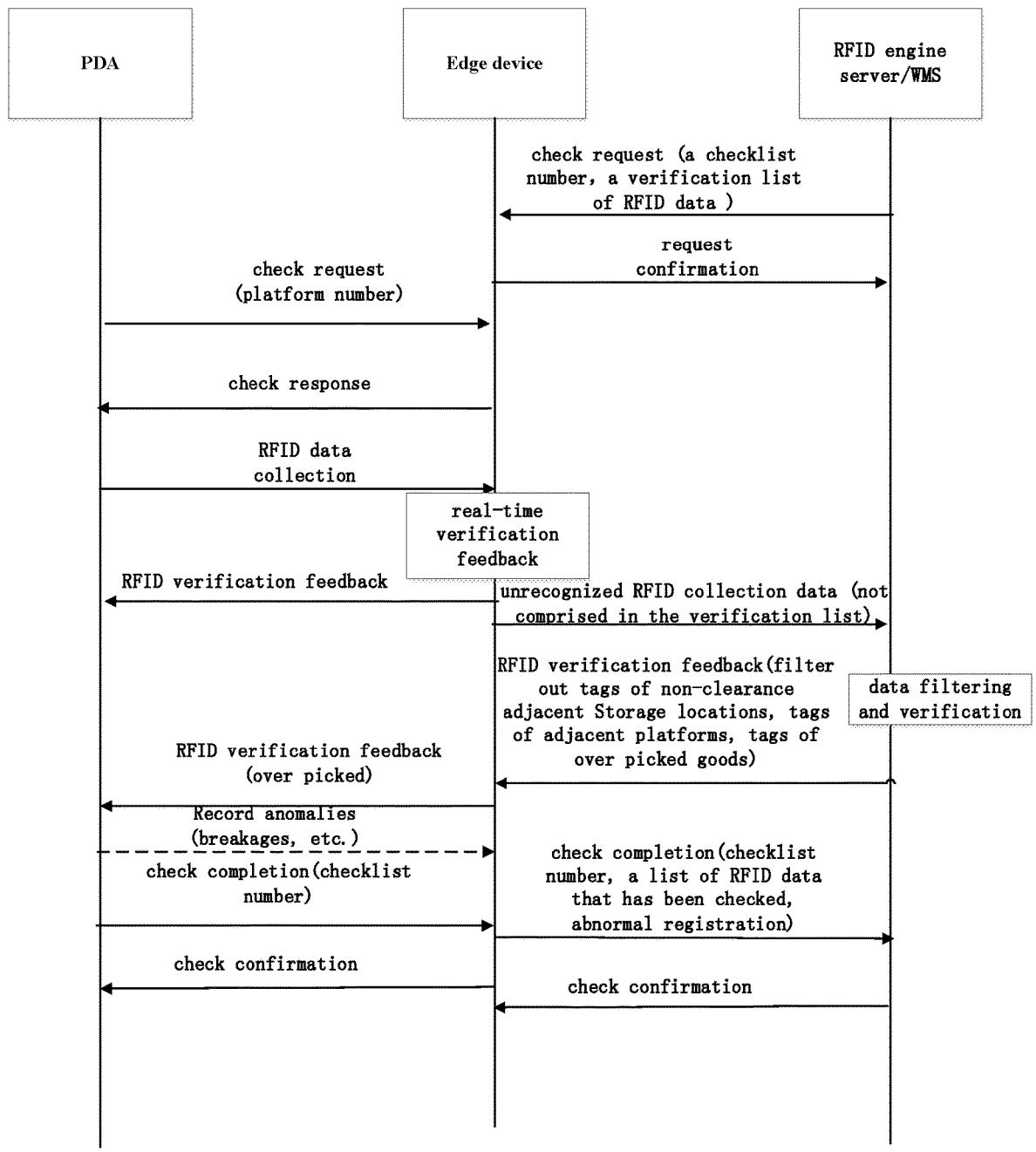
FIG. 3a is a schematic diagram showing some embodiments of edge device-cloud device collaborative verification according to the present disclosure.

FIG. 3*a* is a schematic diagram showing some embodiments of edge device-cloud device collaborative verification according to the present disclosure.

As shown in FIG. 3*a*, the edge device receives a check request issued by the cloud device (such as a RFID engine server or WMS), the check request comprising a list of RFID data to be checked as the cloud data, as well as a checklist number, etc.; the edge device returns request confirmation information.

The edge device receives a check request sent from the terminal device (such as a PDA), the check request comprising a platform number of a cargo area to be checked; the edge device returns checking response. The edge device receives RFID data collected by the terminal device as the terminal data; and provides real-time verification feedback.

The edge device returns RFID verification feedback to the terminal device and returns unrecognized RFID collection data (terminal data that do not match the cloud data) to the cloud device; After filtering and verifying this collection data, the cloud device returns RFID verification feedback.

The edge device sends a result of filtering of abnormal data and verification performed by the cloud device on the mismatched terminal data (such as data caused by picking more goods) to the terminal device; the edge device receives check completion information returned from the terminal device, the check completion information comprising a checklist number; the edge device sends check completion information to the cloud device, the check completion information comprising a checklist number, a list of RFID data that has been checked, and registration information about abnormal situation.

Figure 3B:
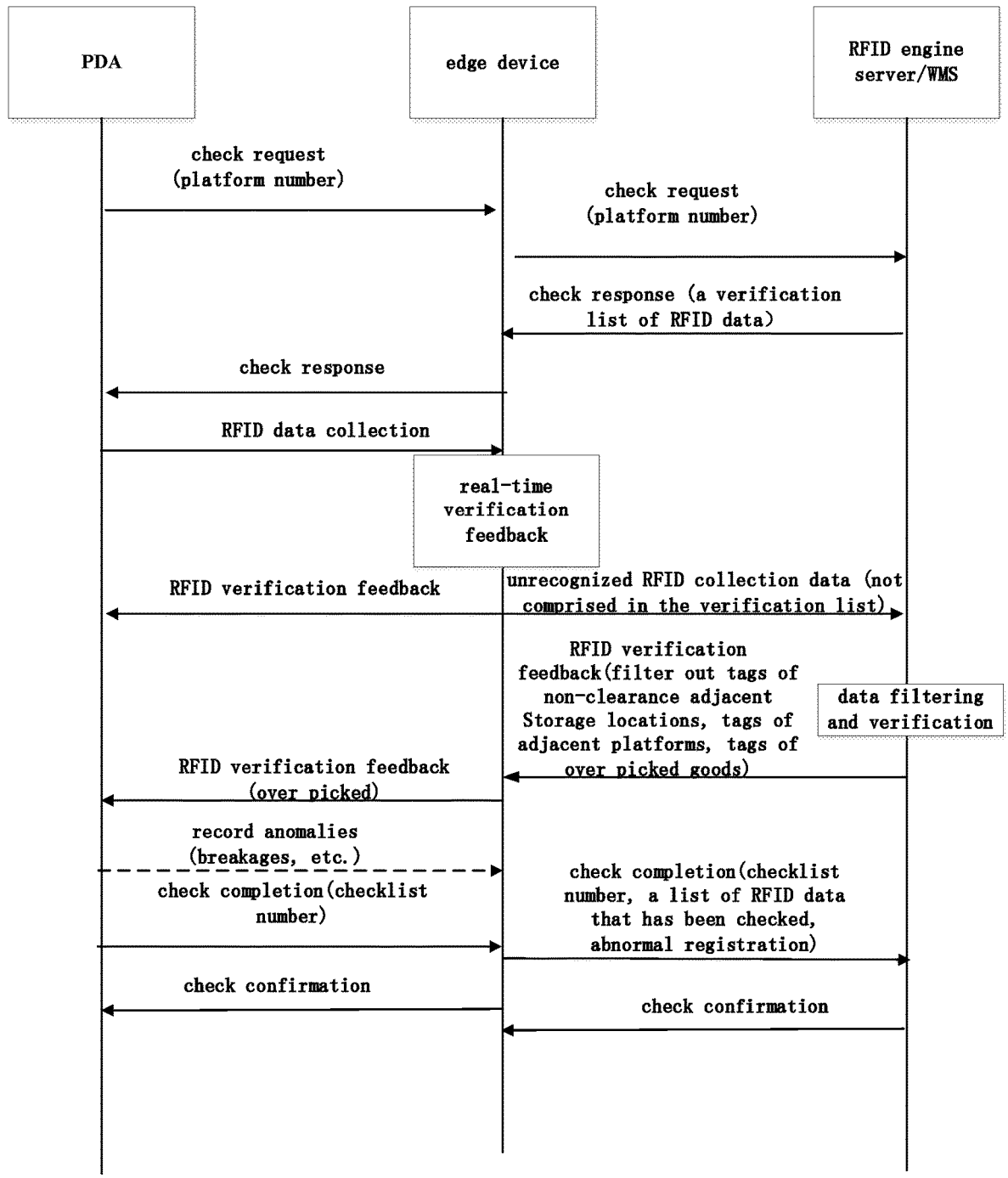
FIG. 3b is a schematic diagram showing some other embodiments of edge device-cloud device collaborative verification according to the present disclosure.

FIG. 3b is a schematic diagram showing some other embodiments of edge device-cloud device collaborative verification according to the present disclosure.

As shown in FIG. 3b, the edge device sends a check request from the terminal device to the cloud device, the check request comprising information on a warehouse area where item data to be checked is located (such as a platform number); the edge device sends a check response returned from the cloud device to the terminal device, the check response comprising a list of RFID data to be checked as cloud data; the edge device receives RFID data collected by the terminal device as the terminal data.

Figure 3C:
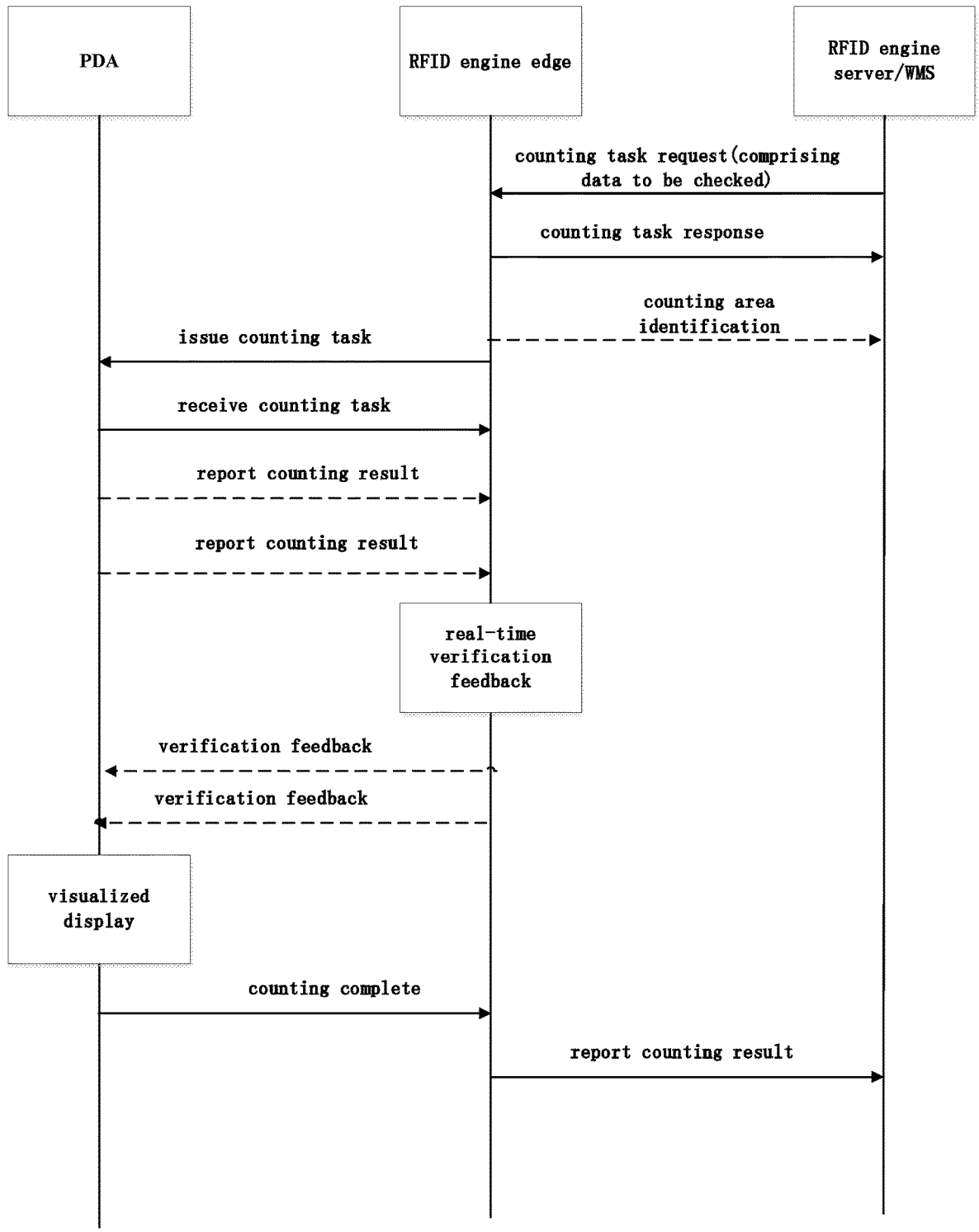
FIG. 3c is a schematic diagram showing some embodiments of inventory verification according to the present disclosure.

FIG. 3c is a schematic diagram showing some embodiments of inventory verification according to the present disclosure.

As shown in FIG. 3c, the edge device receives a counting request issued by the cloud device, the counting request comprising a list of data to be checked as the cloud data, and returns a counting task response. For example, a counting area identification can also be returned.

The edge device assigns a counting task to the terminal device, and receives counting data collected by the terminal device as the terminal data for verification. For example, inventory data may comprise a list of RFID data.

The edge device sends a result of the verification to the terminal device, which may perform a visualized display; after receiving counting completion information returned from the terminal device, the edge device sends counting result data to the cloud device.

For example, the counting result data comprise at least one of a counting data list or a result of the verification.

Figure 3D:
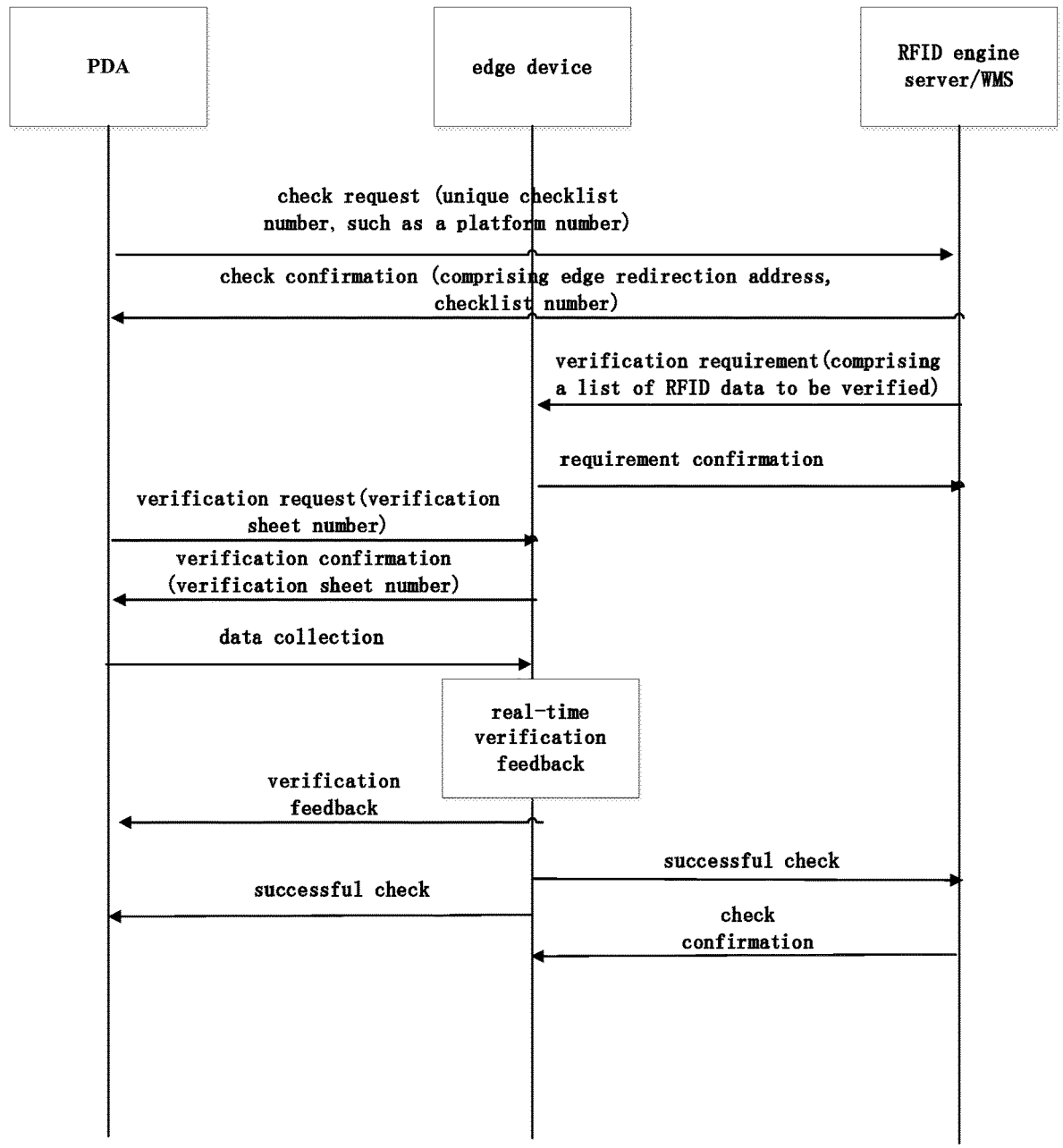
FIG. 3d is a schematic diagram showing some embodiments of checking verification according to the present disclosure.

FIG. 3d is a schematic diagram showing some embodiments of check verification according to the present disclosure.

As shown in FIG. 3d, the terminal device sends a check request to a server device, comprising a checklist number (such as a platform number, the identification of a storage location waiting for check); the server device returns check confirmation information, comprising an edge location address pointing to an edge device corresponding to the checklist number, as well as a verification sheet number.

The edge device receives a verification request sent from the terminal device based on an edge location address issued by the cloud device and comprising a verification sheet number; the edge device sends verification confirmation information to the terminal device, the verification confirmation information comprising a verification sheet number; the edge device receives RFID data collected by the terminal device as the terminal data.

Figure 3E:
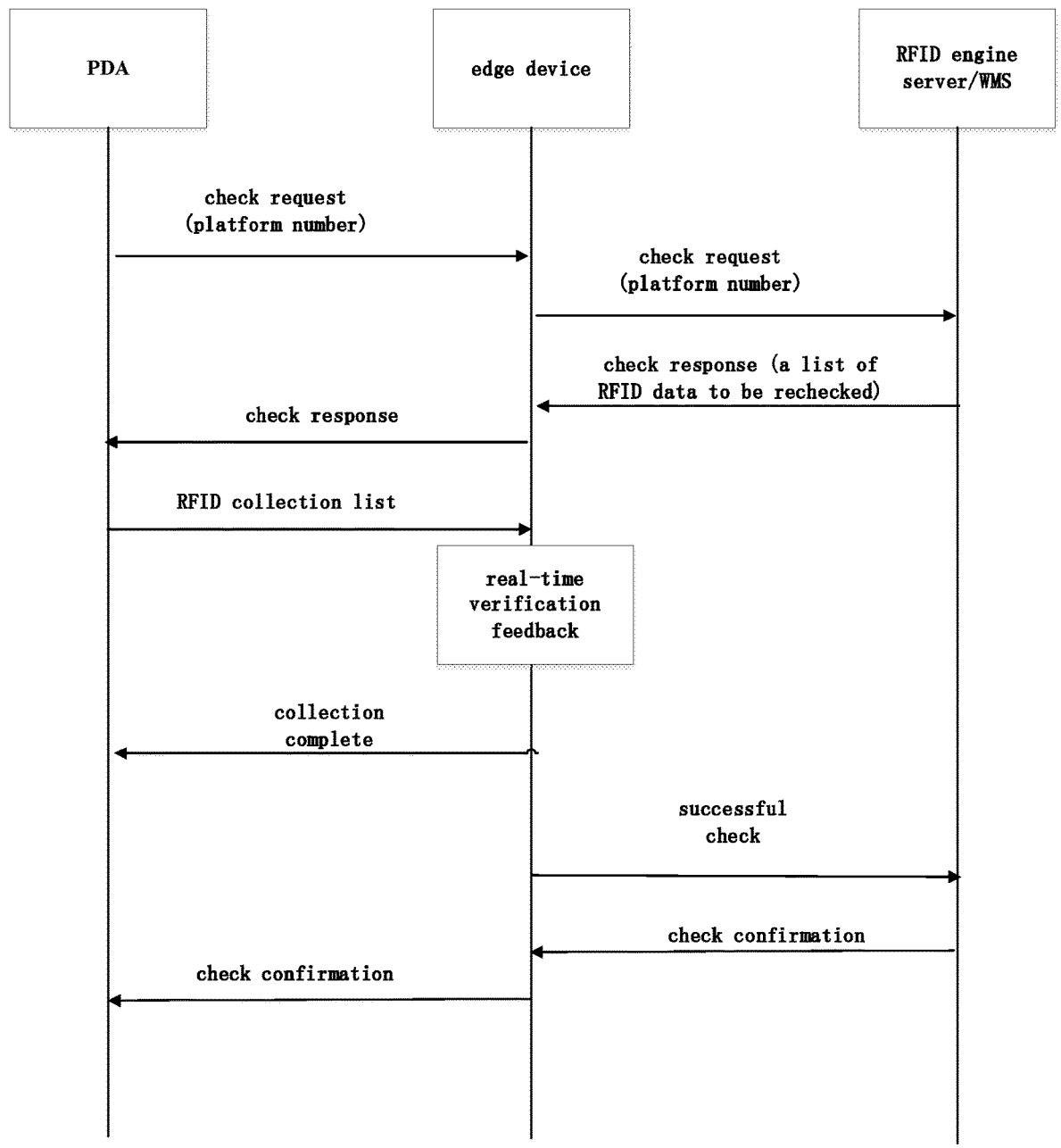
FIG. 3e is a schematic diagram showing some other embodiments of checking verification according to the present disclosure.

FIG. 3e is a schematic diagram showing some other embodiments of check verification according to the present disclosure.

As shown in FIG. 3e, the edge device sends a check request from the terminal device to the cloud device, the check request comprising information on a warehouse area where item data to be checked is located; the edge device sends a check response returned from the cloud device to the terminal device, the check response comprising a list of RFID data to be checked as the cloud data; the edge device receives collected RFID data returned from the terminal device as the terminal data.

Figure 3F:
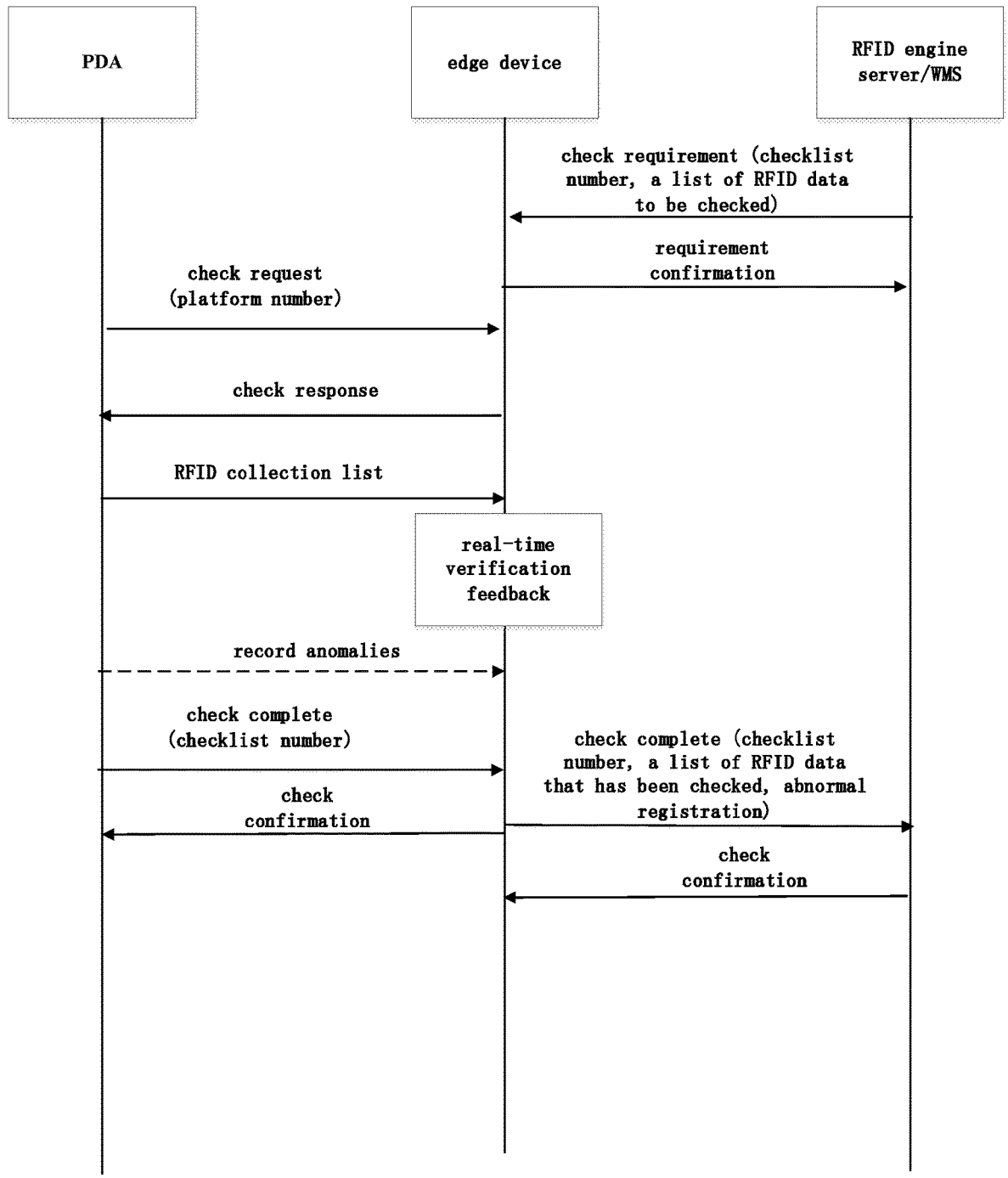
FIG. 3f is a schematic diagram showing still other embodiments of checking verification according to the present disclosure.

FIG. 3f is a schematic diagram showing still other embodiments of check verification according to the present disclosure.

As shown in FIG. 3f, the edge device receives a check request issued by the cloud device, the check request issued by the cloud device comprising a list of RFID data to be checked as the cloud data; the edge device receives a check request sent from the terminal device, the check request sent from the terminal device comprising information on a warehouse area where item data to be checked is located; the edge device sends a check response to the terminal device; the edge device receives collected RFID data returned from the terminal device as the terminal data.

The terminal device may send abnormal registration information and check completion information to the edge device; the edge device sends the abnormal registration information and check completion information to the cloud device.

Figure 3G:
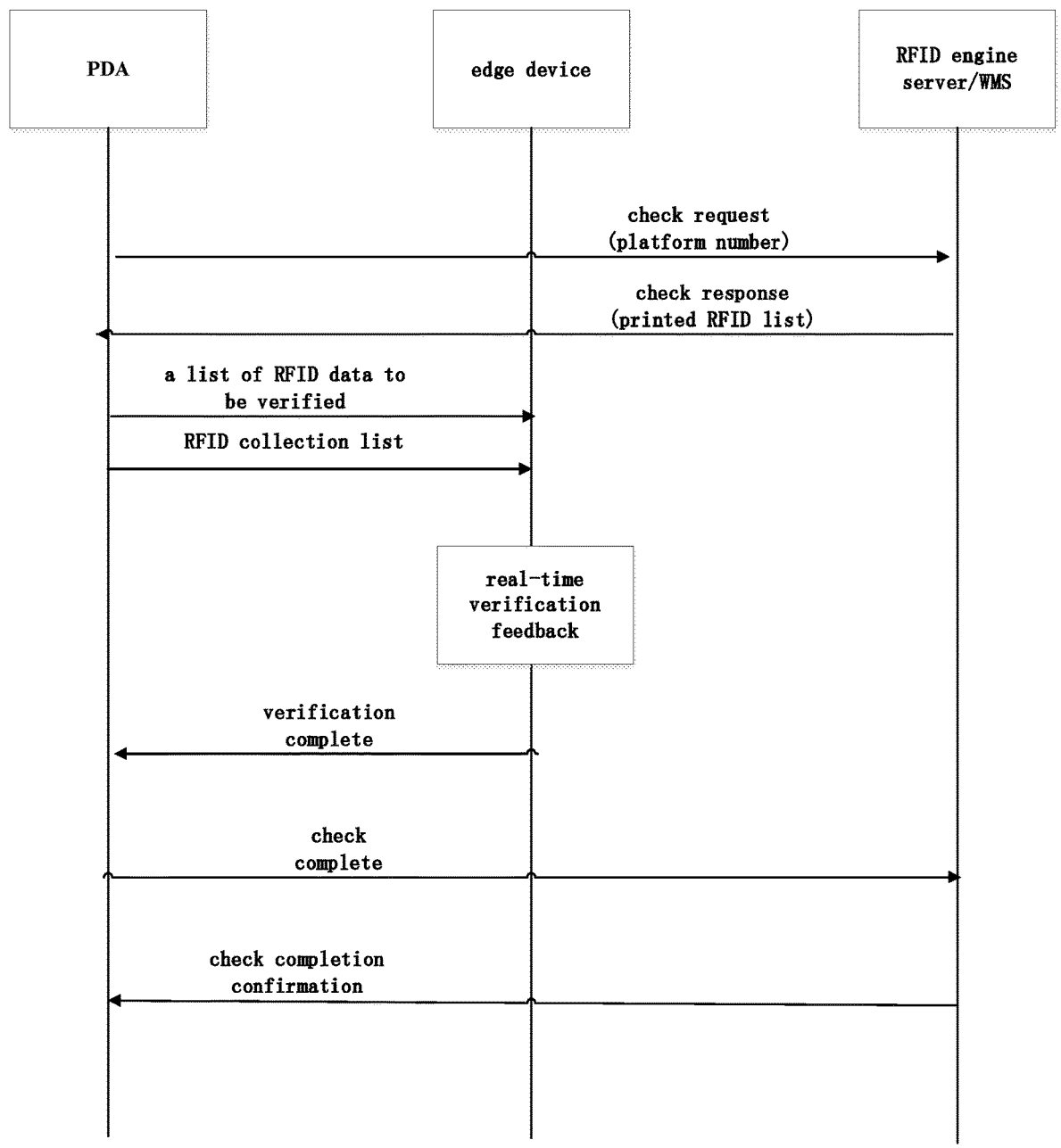
FIG. 3g is a schematic diagram showing further embodiments of checking verification according to the present disclosure.

FIG. 3g is a schematic diagram showing further embodiments of check verification according to the present disclosure.

As shown in FIG. 3g, the terminal device sends a check request to the cloud device, the check request comprising a platform number where items to be checked are located; the cloud device returns a check response, comprising a list of RFID data to be checked.

The edge device receives a list of RFID data to be checked issued by the cloud device and forwarded by the terminal device as the cloud data, the cloud data being issued from the cloud device to the terminal device in response to the check request sent from the terminal device; the edge device receives collected RFID data sent from the terminal device as the terminal data.

Figure 3H:
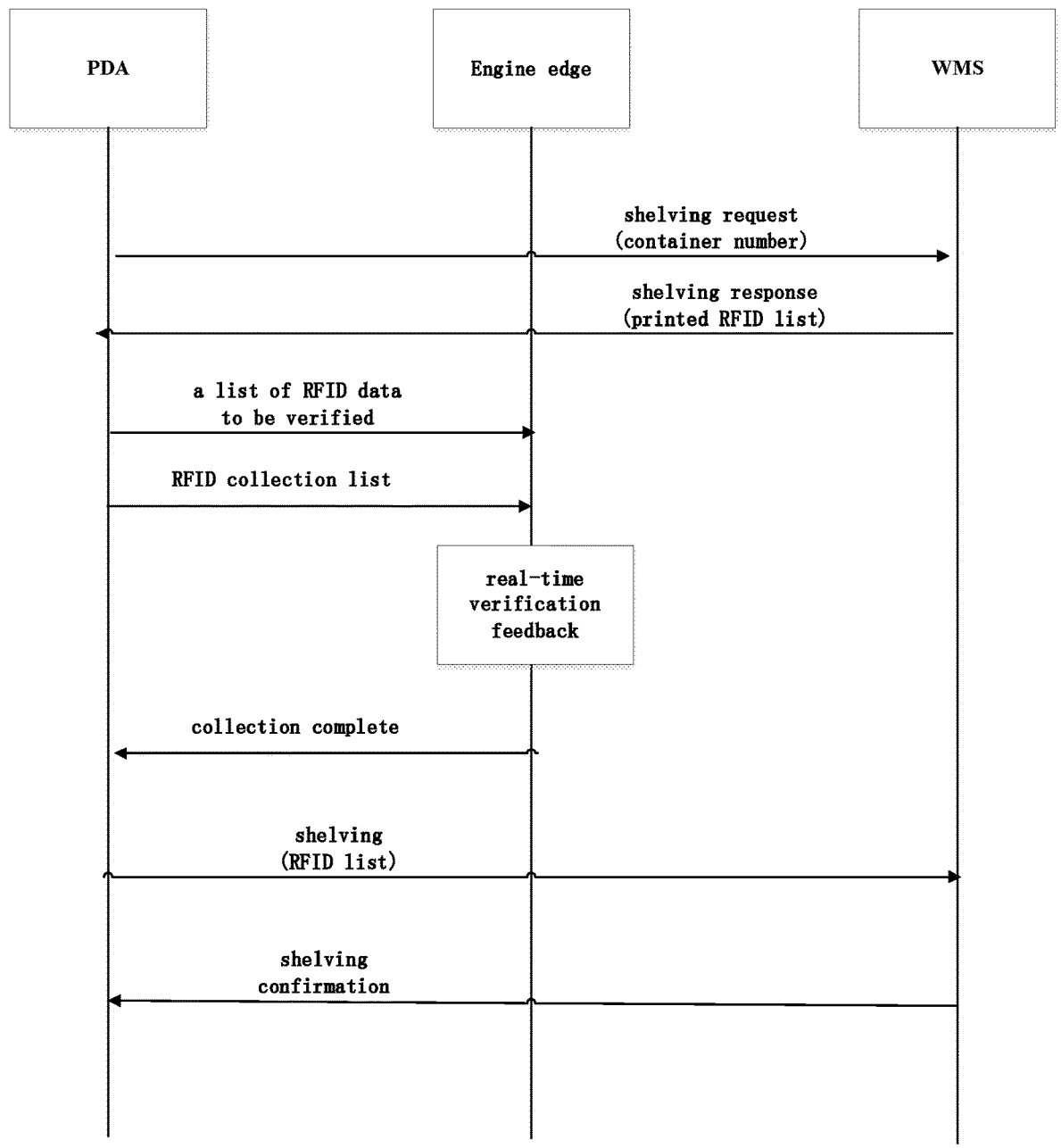
FIG. 3h is a schematic diagram showing some embodiments of inbound and receipt verification according to the present disclosure.

FIG. 3h is a schematic diagram showing some embodiments of inbound and receipt verification according to the present disclosure.

As shown in FIG. 3h, the terminal device sends a shelving request to the cloud device, the shelving request comprising a container number of goods to be shelved; the cloud device returns a shelving response, comprising a list of RFID data (of items) to be shelved.

The edge device receives a list of RFID data (of items) to be shelved that is issued by the cloud device and forwarded by the terminal device as the cloud data, the cloud data being issued from the cloud device to the terminal device in response to a shelving request sent from the terminal device; the edge device receives collected RFID data sent from the terminal device as the terminal data.

The edge device sends collection completion information to the terminal device; the terminal device sends a list of RFID data (of items) to be shelved to the cloud device.

Figure 3I:
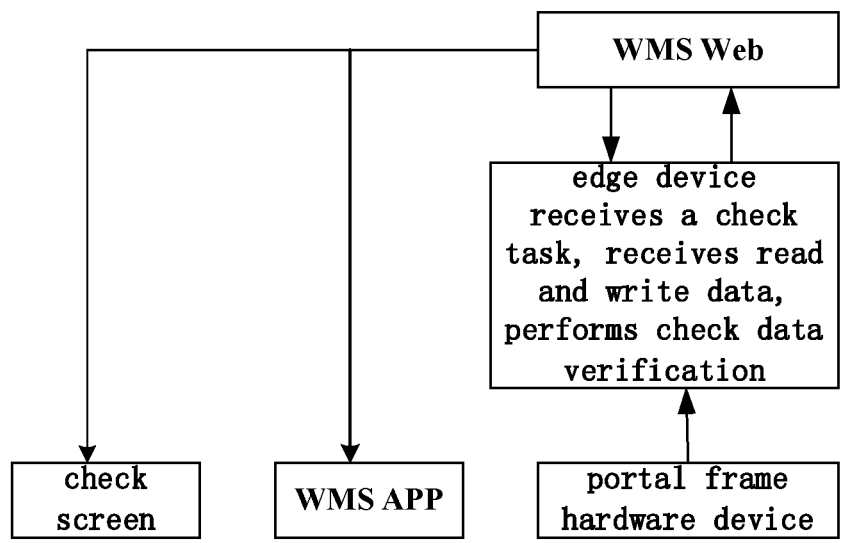
FIG. 3i is a schematic diagram showing some embodiments of the data verification method according to the present disclosure.

FIG. 3i is a schematic diagram showing some embodiments of the data verification method according to the present disclosure.

As shown in FIG. 3i, the terminal device is a portal frame hardware device, the cloud device are a WMS, the cloud data are checklist data, and the terminal data are RFID data.

The edge device receives a checklist (check task) sent from the WMS and the RFID data (read and write data) sent from the portal frame hardware device; the edge device performs checking data verification.

The edge device sends a result of the checking data verification to an application of the WMS, and sends checking status to a display device of the terminal device.

For example, the checking status can also be sent to the cloud device or to a display device at the warehouse location.

In the above embodiments, the cost and power consumption of the RFID collection device are reduced; the RFID verification response can be accelerated and the business experience can be improved; through terminal device-cloud device collaboration and terminal device-edge device collaboration, as well as the on-demand control of the distribution of verification data, system security can be improved.

Figure 4:
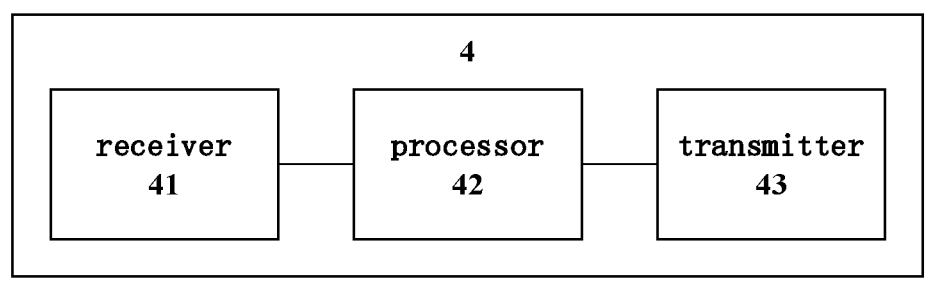
FIG. 4 is a block diagram showing some embodiments of an edge device according to the present disclosure.

FIG. 4 is a block diagram showing some embodiments of an edge device according to the present disclosure.

As shown in FIG. 4, the edge device 4 comprises: a receiver 41 for receiving cloud data issued by a cloud device and terminal data collected by a terminal device; a processor 42 for verifying the cloud data and the terminal data based on business process logic; a transmitter 43 for transmitting a result of the verifying to at least one of the cloud device or the terminal device.

In some embodiments, the transmitter 43 sends a verification activation request to the cloud device; the receiver 41 receives an activation response returned from the cloud device, the activation response comprising relevant information about the business process logic.

In some embodiments, the verification activation request comprises version information of edge software currently deployed on the edge device, and the activation response comprises update information of the edge software.

In some embodiments, the processor 42 matches the terminal data to the cloud data; the processor 42 determines whether the verifying is passed based on a result of the match.

In some embodiments, the processor 42 determines whether the terminal data comprise abnormal data; the processor 42 determines whether the verifying is passed based on a result of the determination and a result of the match.

In some embodiments, the cloud data are checklist data comprising item tag data; the processor 42 determines whether the terminal data comprise abnormal data based on at least one of item location information or tag data status information.

In some embodiments, the cloud data comprise item tag data; the processor 42 determines whether the terminal data match a location where the terminal device is located; in case of mismatch between the terminal data and the location, the transmitter 43 reports the terminal data to the cloud device, for the cloud device to determine whether the terminal data are abnormal data.

In some embodiments, the receiver 41 receives a check request issued by the cloud device, the check request comprising a list of RFID data to be checked as the cloud data; and receives RFID data collected by the terminal device as the terminal data.

In some embodiments, the transmitter 43 sends the terminal data that do not match the cloud data to the cloud device; sends a result of filtering of abnormal data and verification performed by the cloud device on the mismatched terminal data to the terminal device; receives check completion information returned from the terminal device, the check completion information comprising a checklist number; and sends check completion information to the cloud device, the check completion information comprising a checklist number, a list of RFID data that has been checked, and abnormal situation registration information.

In some embodiments, the receiver 41 receives a verification request sent from the terminal device based on an edge location address issued by the cloud device and comprising a verification sheet number; the transmitter 43 sends verification confirmation information to the terminal device, the verification confirmation information comprising a verification sheet number; the receiver 41 receives RFID data collected by the terminal device as the terminal data.

In some embodiments, the transmitter 43 sends a check request that is sent from the terminal device to the cloud device, the check request comprising information on the location of item data to be checked; sends a check response returned from the cloud device to the terminal device, the check response comprising a list of RFID data to be checked as cloud data; the receiver 41 receives RFID data collected by the terminal device as the terminal data.

In some embodiments, the receiver 41 receives a counting request issued by the cloud device, the counting request comprising a list of data to be checked as the cloud data; the receiver 41 receives counting data collected by the terminal device as the terminal data.

In some embodiments, the transmitter 43 sends a result of the verification to the terminal device; after the receiver 41 receives counting completion information returned from the terminal device, the transmitter 43 sends counting result data to the cloud device.

In some embodiments, the transmitter 43 sends a check request that is sent from the terminal device to the cloud device, the check request comprising information on a warehouse area where item data to be checked is located; sends a check response returned from the cloud device to the terminal device, the check response comprising a list of RFID data to be checked as cloud data; the receiver 41 receives collected RFID data returned from the terminal device as the terminal data.

In some embodiments, the receiver 41 receives a check request issued by the cloud device, the check request issued by the cloud device comprising a list of RFID data to be checked as the cloud data; receives a check request sent from the terminal device, the check request sent from the terminal device comprising information on a warehouse area where item data to be checked is located; the transmitter 43 sends a check response to the terminal device; the edge device receives collected RFID data returned from the terminal device as the terminal data.

In some embodiments, the receiver 41 receives a list of RFID data to be checked issued by the cloud device and forwarded by the terminal device as the cloud data, the cloud data being issued from the cloud device to the terminal device in response to the check request sent from the terminal device; the receiver 41 receives collected RFID data sent from the terminal device as the terminal data.

In some embodiments, the receiver 41 receives a list of RFID data of items to be shelved that is issued by the cloud device and forwarded by the terminal device as the cloud data, the cloud data being issued from the cloud device to the terminal device in response to a shelving request sent from the terminal device; the receiver 41 receives collected RFID data sent from the terminal device as the terminal data.

In some embodiments, the terminal device is a portal frame hardware device, the cloud device is an item management system, the cloud data are checklist data, and the terminal data are RFID data; the processor 42 performs checking data verification; the transmitter 43 sends a checking data verification result to an application on the item management system and sends checking status to a display device.

Figure 5:
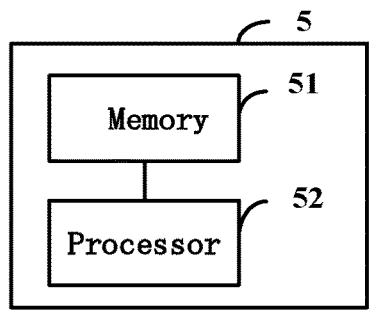
FIG. 5 is a block diagram showing some other embodiments of the edge device according to the present disclosure.

FIG. 5 is a block diagram showing some other embodiments of the edge device according to the present disclosure.

As shown in FIG. 5, the edge device 5 of this embodiment comprises: memory 51 and a processor 52 coupled to the memory 51, the processor 52 configured to, based on instructions stored in the memory 51, carry out the data verification method according to any one of the embodiments of the present disclosure.

The memory 51 may comprise, for example, system memory, a fixed non-volatile storage medium, or the like. The system memory stores, for example, an operating system, applications, a boot loader, a database, and other programs.

Figure 6:
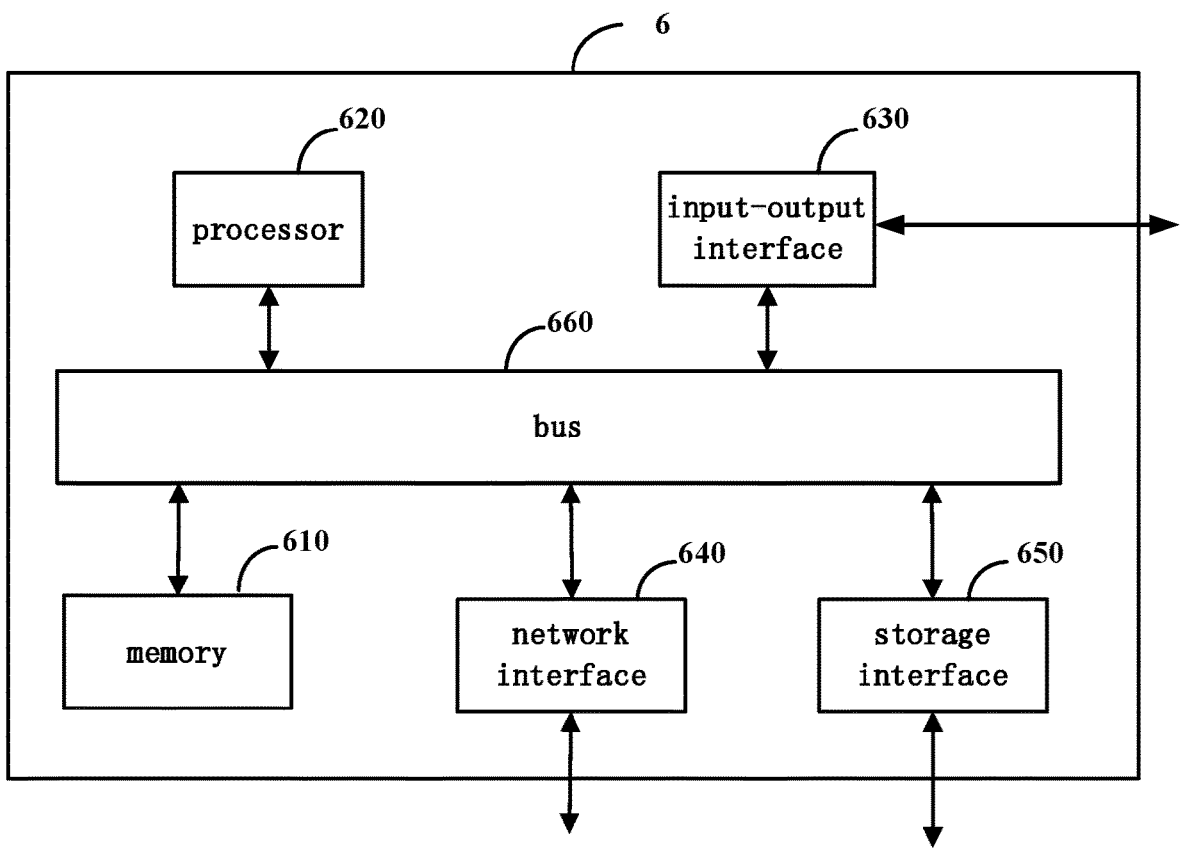
FIG. 6 is a block diagram showing still other embodiments of the edge device according to the present disclosure.

FIG. 6 is a block diagram showing still other embodiments of the edge device according to the present disclosure.

As shown in FIG. 6, the edge device 6 of this embodiment comprises: memory 610 and a processor 620 coupled to the memory 610, the processor 620 configured to, based on instructions stored in the memory 610, carry out the data verification method according to any one of the embodiments of the present disclosure.

The memory 610 may comprise, for example, system memory, a fixed non-volatile storage medium, or the like. The system memory stores, for example, an operating system, application programs, a boot loader, and other programs.

The edge device 6 may further comprise an input-output interface 630, a network interface 640, a storage interface 650, and the like. These interfaces 630, 640, 650, the memory 610 and the processor 620 may be connected through a bus 660, for example. The input-output interface 630 provides a connection interface for input-output devices such as a display, a mouse, a keyboard, a touch screen, a microphone, a loudspeaker, etc. The network interface 640 provides a connection interface for various networked devices. The storage interface 650 provides a connection interface for external storage devices such as an SD card and a USB flash disk.

Figure 7:
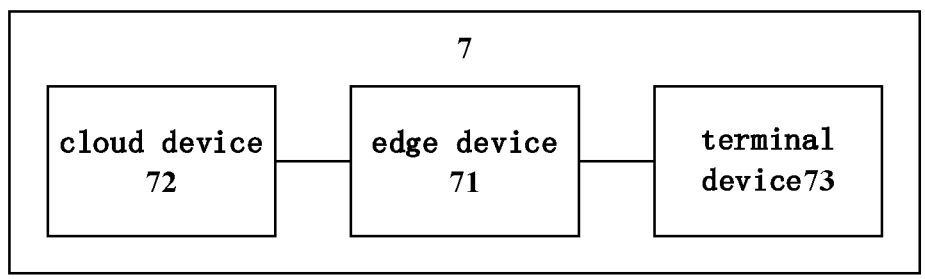
FIG. 7 is a block diagram showing some embodiments of a data verification system according to the present disclosure.

FIG. 7 is a block diagram showing some embodiments of a data verification system according to the present disclosure.

As shown in FIG. 7, the data verification system 7 comprises: an edge device 71 for implementing the data verification method according to any one of the above embodiments; a cloud device 72 for issuing cloud data; a terminal device 73 for collecting terminal data.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

Heretofore, the data verification method, the data verification system, the edge device and the non-volatile computer-readable storage medium according to the present disclosure have been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A data verification method, comprising:
receiving, by an edge device, cloud data issued by a cloud device and terminal data collected by a terminal device;
verifying, by the edge device, the cloud data and the terminal data based on business process logic; and
sending, by the edge device, a result of the verifying to at least one of the cloud device or the terminal device,
wherein the receiving, by an edge device, cloud data issued by a cloud device and terminal data collected by a terminal device comprises:
receiving, by the edge device, a check request issued by the cloud device, the check request comprising a list of Radio Frequency Identification (RFID) data to be checked as the cloud data; and
receiving, by the edge device, RFID data collected by the terminal device as the terminal data, wherein the receiving, by the edge device, RFID data collected by the terminal device as the terminal data comprises:
receiving, by the edge device, a verification request sent from the terminal device based on an edge location address issued by the cloud device and comprising a verification sheet number;
sending, by the edge device, verification confirmation information to the terminal device, the verification confirmation information comprising a verification sheet number; and
receiving, by the edge device, RFID data collected by the terminal device as the terminal data.

2. The data verification method according to claim 1, further comprising, before receiving the cloud data and the terminal data:
sending, by the edge device, a verification activation request to the cloud device; and
receiving, by the edge device, an activation response returned from the cloud device, the activation response comprising relevant information about the business process logic.

3. The data verification method according to claim 2, wherein:
the verification activation request comprises version information of edge software currently deployed on the edge device, and the activation response comprises update information of the edge software.

4. The data verification method according to claim 1, wherein the verifying the cloud data and the terminal data based on business process logic comprises:
   matching, by the edge device, the terminal data with the cloud data, and determining whether the verifying is passed based on a result of the matching; or
   verifying, by the edge device, the terminal data based on the cloud data.

5. The data verification method according to claim 4, wherein the verifying the cloud data and the terminal data based on business process logic comprises:
   determining, by the edge device, whether the terminal data comprises abnormal data; and
   determining, by the edge device, whether the verifying is passed based on a result of the determining and the result of the matching.

6. The data verification method according to claim 5, wherein:
   the cloud data are checklist data comprising item tag data; and
   the determining whether the terminal data comprise abnormal data comprises:
   determining, by the edge device, whether the terminal data comprise abnormal data based on at least one of item location information or tag data status information.

7. The data verification method according to claim 1, wherein:
   the cloud data comprise item tag data; and
   the verifying the cloud data and the terminal data based on business process logic comprises:
   determining, by the edge device, whether the terminal data match a location where the terminal device is located; and
   in case of the terminal data not matching the location, reporting, by the edge device, the terminal data to the cloud device, for the cloud device to determine whether the terminal data are abnormal data.

8. The data verification method according to claim 1, wherein the sending a result of the verifying to at least one of the cloud device or the terminal device comprises:
   sending, by the edge device, the terminal data that do not match the cloud data to the cloud device;
   sending, by the edge device, a result of filtering of abnormal data and verification performed by the cloud device on mismatched terminal data to the terminal device;
   receiving, by the edge device, check completion information returned from the terminal device, the check completion information comprising a checklist number; and
   sending, by the edge device, check completion information to the cloud device, the check completion information comprising the checklist number, the list of RFID data that has been checked, and registration information about abnormal situation.

9. The data verification method according to claim 1, wherein the receiving, by an edge device, cloud data issued by a cloud device and terminal data collected by a terminal device comprises:
   sending, by the edge device, a check request sent from the terminal device to the cloud device, the check request comprising information on the location of item data to be checked;
   sending, by the edge device, a check response returned from the cloud device to the terminal device, the check response comprising a list of RFID data to be checked as the cloud data; and
   receiving, by the edge device, RFID data collected by the terminal device as the terminal data.

10. The data verification method according to claim 1, wherein the receiving, by an edge device, cloud data issued by a cloud device and terminal data collected by a terminal device comprises:
    receiving, by the edge device, a counting request issued by the cloud device, the counting request comprising a list of data to be checked as the cloud data; and
    receiving, by the edge device, counting data collected by the terminal device as the terminal data.

11. The data verification method according to claim 10, wherein the sending a result of the verifying to at least one of the cloud device or the terminal device comprises:
    sending, by the edge device, the result of the verifying to the terminal device; and
    after receiving counting completion information returned from the terminal device, sending, by the edge device, counting result data to the cloud device.

12. The data verification method according to claim 1, wherein the receiving, by an edge device, cloud data issued by a cloud device and terminal data collected by a terminal device comprises:
    sending, by the edge device, a check request sent from the terminal device to the cloud device, the check request comprising information on a warehouse area where item data to be checked is located;
    sending, by the edge device, a check response returned from the cloud device to the terminal device, the check response comprising a list of RFID data to be checked as the cloud data; and
    receiving, by the edge device, collected RFID data returned from the terminal device as the terminal data.

13. The data verification method according to claim 1, wherein the receiving, by an edge device, cloud data issued by a cloud device and terminal data collected by a terminal device comprises:
    receiving, by the edge device, a check request issued by the cloud device, the check request issued by the cloud device comprising a list of RFID data to be checked as the cloud data;
    receiving, by the edge device, a check request sent from the terminal device, the check request sent from the terminal device comprising information on a warehouse area where item data to be checked is located;
    sending, by the edge device, a check response to the terminal device; and
    receiving, by the edge device, collected RFID data returned from the terminal device as the terminal data.

14. The data verification method according to claim 1, wherein the receiving, by an edge device, cloud data issued by a cloud device and terminal data collected by a terminal device comprises:
    receiving, by the edge device, a list of RFID data to be checked issued by the cloud device and forwarded by the terminal device as the cloud data, the cloud data being issued from the cloud device to the terminal device in response to a check request sent from the terminal device, or
    receiving, by the edge device, a list of RFID data of items to be shelved that is issued by the cloud device and forwarded by the terminal device as the cloud data, the cloud data being issued from the cloud device to the terminal device in response to a shelving request sent from the terminal device; and receiving, by the edge device, collected RFID data sent from the terminal device as the terminal data.

15. The data verification method according to claim 1, wherein:

the terminal device is a portal frame hardware device, the cloud device is an item management system, the cloud data are checklist data, the terminal data are RFID data;

the verifying the cloud data and the terminal data based on business process logic comprises verifying checking data by the edge device; and the sending a result of the verifying to at least one of the cloud device or the terminal device comprises:

sending a result of the verifying of the checking data to an application on the item management system and sending checking status to a display device.

16. An edge device, comprising:

a memory; and a processor coupled to the memory, the processor configured to, based on instructions stored in the memory, carry out a data verification method comprising:

receiving cloud data issued by a cloud device and terminal data collected by a terminal device;

verifying the cloud data and the terminal data based on business process logic; and sending a result of the verifying to at least one of the cloud device or the terminal device, wherein the receiving cloud data issued by a cloud device and terminal data collected by a terminal device comprises:

receiving a check request issued by the cloud device, the check request comprising a list of Radio Frequency Identification (RFID) data to be checked as the cloud data; and receiving RFID data collected by the terminal device as the terminal data, wherein the receiving RFID data collected by the terminal device as the terminal data comprises: receiving a verification request sent from the terminal device based on an edge location address issued by the cloud device and comprising a verification sheet number; sending verification confirmation information to the terminal device, the verification confirmation information comprising a verification sheet number; and receiving RFID data collected by the terminal device as the terminal data.

17. A data verification system, comprising:

an edge device for implementing the data verification method according to claim 16;

a cloud device for issuing cloud data; and a terminal device for collecting terminal data.

18. A non-transitory computer-readable storage medium having stored thereon computer program instructions which, when executed by a processor, implements a data verification method comprising:

receiving cloud data issued by a cloud device and terminal data collected by a terminal device;

verifying the cloud data and the terminal data based on business process logic; and sending a result of the verifying to at least one of the cloud device or the terminal device, wherein the receiving cloud data issued by a cloud device and terminal data collected by a terminal device comprises:

receiving a check request issued by the cloud device, the check request comprising a list of Radio Frequency Identification (RFID) data to be checked as the cloud data; and receiving RFID data collected by the terminal device as the terminal data, wherein the receiving RFID data collected by the terminal device as the terminal data comprises: receiving a verification request sent from the terminal device based on an edge location address issued by the cloud device and comprising a verification sheet number; sending verification confirmation information to the terminal device, the verification confirmation information comprising a verification sheet number; and receiving RFID data collected by the terminal device as the terminal data.

* * * * *